United States Patent
Fong

[11] 3,721,844
[45] March 20, 1973

[54] RELUCTANCE MOTORS

[75] Inventor: William Fong, Westbury-on-Trym, Bristol, England

[73] Assignee: National Research Development Corporation, London, England

[22] Filed: May 27, 1971

[21] Appl. No.: 147,604

Related U.S. Application Data

[63] Continuation of Ser. No. 832,663, June 12, 1969, abandoned.

[52] U.S. Cl. ................................310/166, 310/162
[51] Int. Cl. .............................................H02k 17/00
[58] Field of Search......310/168, 211, 162, 163, 201, 310/179, 185, 192, 190, 181, 156, 166, 188

[56] References Cited

UNITED STATES PATENTS

| | | | |
|---|---|---|---|
| 2,913,607 | 11/1959 | Douglas | 310/162 |
| 3,126,493 | 3/1964 | Honsinger | 310/162 |
| 2,733,362 | 1/1956 | Bauer | 310/162 |
| 2,975,310 | 3/1961 | Armstrong | 310/163 |
| 3,016,482 | 1/1962 | Andersen | 310/211 |
| 3,210,584 | 10/1965 | Jorgensen | 310/211 |

*Primary Examiner*—R. Skudy
*Attorney*—Cushman, Darby & Cushman

[57] ABSTRACT

The rotor of a reluctance motor has a squirrel cage winding and flux barriers which follow the paths of direct axis flux between alternate pairs of poles but lie athwart the paths of quadrature axis flux. The number of flux barriers is equal to half the number of poles for which the stator is wound, but there are not less than three flux barriers. The angles subtended at the central axis of the rotor between the ends of each flux barrier and between the ends of adjacent flux barriers are all equal to each other. In addition auxiliary flux barriers may be provided which are embraced by the main flux barriers or extend between the ends of adjacent flux barriers, or both. Also circumferential grooves may be provided either in sectors defined by the end of the main flux barriers or in sectors defined by the ends of adjacent flux barriers, or both.

7 Claims, 10 Drawing Figures

RELUCTANCE MOTORS

This is a continuation of application Ser. No. 832,663 filed on June 12, 1969, now abandoned.

This invention relates to reluctance motors.

Such motors comprise a stator having a single-phase or multi-phase winding providing a pulsating or rotating multipole magnetic field and a rotor provided with a short circuited winding of a squirrel cage or other type similar to the winding of the rotor of an induction motor and magnetic material distributed anisotropically in a manner that matches the stator multipolar magnetic field. The anisotropic distribution of magnetic material provides for flux paths of low magnetic reluctance when the rotor is in one position relative to the stator magnetic field, such flux being termed the direct axis flux, and for paths of high magnetic reluctance when the rotor is 90 electrical degrees relative to the direct axis position, such a position being termed the quadrature axis position. In operation of a reluctance motor the rotor runs up to near synchronous speed in a manner similar to an induction motor and thereafter locks on to the stator magnetic field and rotates in synchronism therewith.

It is an object of the present invention to provide a rotor of novel construction for a reluctance motor.

According to the present invention a reluctance motor comprises a stator member wound to provide a magnetic field having $p$ pole-pairs and a rotor member having a short circuited electrical winding and magnetic material in which there are $p$ flux barriers following the paths of direct axis flux between alternate pairs of adjacent poles but lying athwart the paths of quadrature axis flux (where $p$ is a whole number of 3 or more).

Preferably the flux barriers are symmetrically distributed around the periphery of the rotor and the angles at the central axis of the rotor subtended between the ends of a flux barrier are given by $\pi/p$ radians. The angles between the ends of adjacent flux barriers are also of this value.

In addition to the barriers mentioned above auxiliary flux barriers may also be provided which extend generally parallel to the aforementioned flux barriers and are embraced by them. Also circumferential grooves may be provided in the motor either within sectors defined by the ends of the flux barriers or between the sectors defined by the ends of adjacent flux barriers or more preferably both.

Alternatively, two sets of auxiliary flux barriers may be provided each set being equal in number to the number of main flux barriers, one set of flux barriers lying generally parallel to the main flux barriers and being embraced by them, and the other set lying in the sectors between adjacent main flux barriers.

In order that the invention may be more fully understood reference will now be made to the drawing accompanying this specification for which:

FIGS. 1 to 4 illustrate in section rotor stampings for motors having pole pairs of from three to six inclusive, FIG. 5 illustrates a rotor stamping for a three pole-pair machine including auxiliary barriers and axial grooves, and FIGS. 6 to 10 inclusive illustrate further modifications of the invention.

Referring now to FIG. 1 there is shown therein a unitary stamping for a rotor for use in a motor in which the stator is wound for three pole-pairs, i.e. is a six pole machine. The rotor stamping has three flux barriers 1, 2 and 3 symmetrically distributed around its periphery so that the angle subtended between the ends of each flux barrier is $\pi/3$ radians. The angle between the ends of adjacent flux barriers is also $\pi/3$ radians. The flux barriers generally lie parallel to the path taken by direct axis magnetic flux in passing from a stator pole through the air gap and the rotor to the adjacent stator pole. However, they lie athwart the paths of quadrature axis flux, and the polarities of the rotor when in the quadrature axis position are marked in the figure.

The flux barriers 1, 2 and 3 may be formed by stamping out slits of the shape illustrated in FIG. 1 which shows the flux barriers terminating at positions which are within the boundary of the stamping in a circular stamping of magnetic material. Provision is also made in the stamping for the bars of a squirrel cage winding by providing holes or slots such as holes or slots 4 around the periphery of the stamping.

The construction illustrated in FIG. 1 with reference to a machine having three pole-pairs is also applicable to a machine having a large number of pole-pairs and a suitable stamping for a machine having four pole-pairs is shown in FIG. 2. In this arrangement there are four flux barriers symmetrically distributed around the rotor and the angle between the ends of a flux barrier arrangement will be $\pi/4$. In like manner FIGS. 3 and 4 illustrate rotor stampings for machines having five pole-pairs and six pole-pairs respectively. In FIG. 3 the rotor stamping shown therein has five flux barriers and the angle subtended between the ends of the barriers is $\pi/5$. In FIG. 4 the rotor stamping has six flux barriers and the angle subtended between the ends of the barriers is $\pi/6$. In each case the quadrature axis polarities are marked.

FIG. 5 illustrates a rotor stamping for a machine having three pole-pairs which has some features additional to those illustrated in connection with FIG. 1. In the FIG. 5 arrangement there is provided three flux barriers 1, 2 and 3 which are similar to those in connection with FIG. 1 together with three auxiliary flux barriers 6, 7 and 8 which extend generally parallel to the main flux barriers 1, 2 and 3 and lie within the angles subtended by their ends. Axial grooves 9 are provided in the periphery of the stamping within sectors defined by the ends of the flux barriers and further axial grooves 10, which may be wider than grooves 9, are provided between the ends of adjacent flux barriers.

FIG. 6 illustrates a modification of the invention for a reluctance motor having a stator wound to provide six poles, or three pole-pairs, i.e. $p = 3$. In FIG. 6 a stamping for such a rotor is illustrated and is provided with a plurality of circumferential slots 21 which carry a squirrel cage winding and three main flux barriers 22. As described above the angle subtended at the axis of the rotor between the ends of each main flux barrier 22 is $\pi/3$ radians and the angle subtended between the ends of adjacent flux barriers is also $\pi/3$ radians. These main flux barriers 22 act to reduce the value of the quadrature axis magnetizing reactance. It will be appreciated that it is desirable to reduce this quantity as far as possible and further reduction is achieved by adding a set of additional auxiliary flux barriers 23 which are embraced between the ends of the main flux barriers 22.

In addition yet a further set of auxiliary flux barriers are provided each lying between the ends of adjacent flux barriers 22. These flux barriers 24 are preferably thicker than the flux barriers 23. The angles subtended at the axis of the rotor between the ends of barriers 22 and 23 and between the ends of barriers 22 and 24 need not be identical and can be any convenient value designed to reduce quadrature axis reactance as far as possible.

FIG. 7 illustrates a further modification of the invention in which like parts have the same reference as in FIG. 6. In this Figure in addition to the auxiliary flux barriers 23 and 24 further flux barriers 25 and 26 are provided each extending generally parallel to and embraced by flux barriers 23 and 24 respectively.

Figure 1:
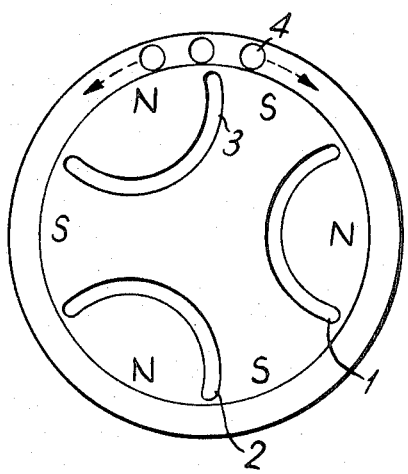
Figure 2:
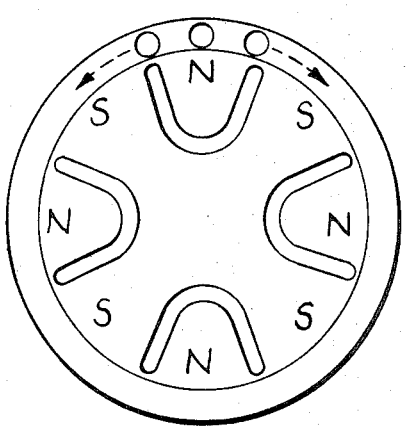
Figure 3:
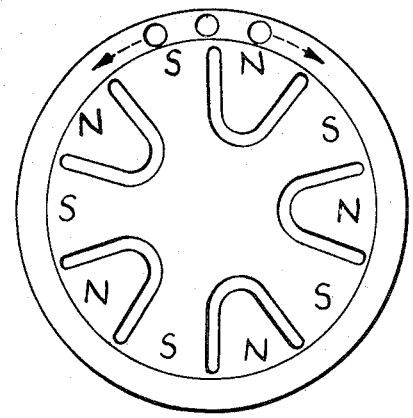
Figure 4:
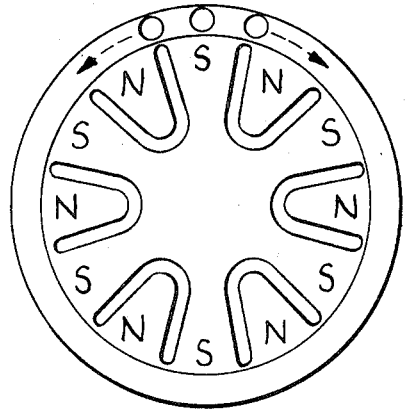
Figure 5:
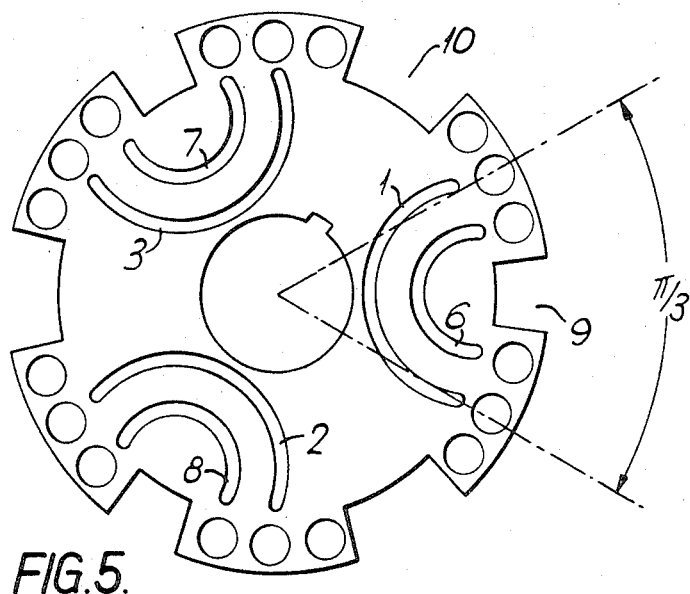
Figure 6:
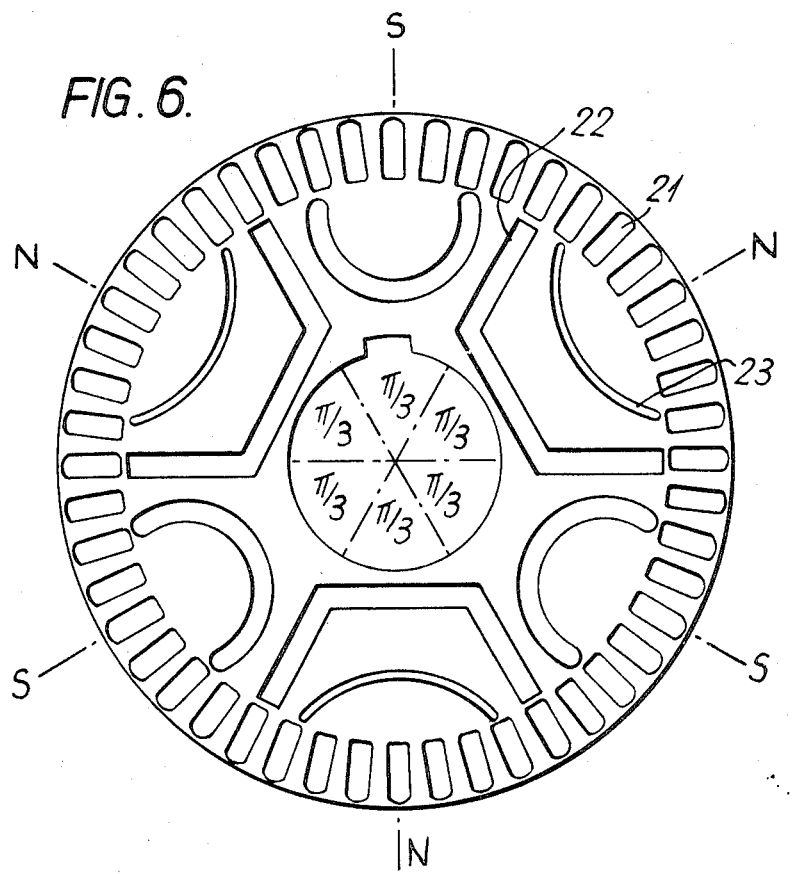
Figure 7:
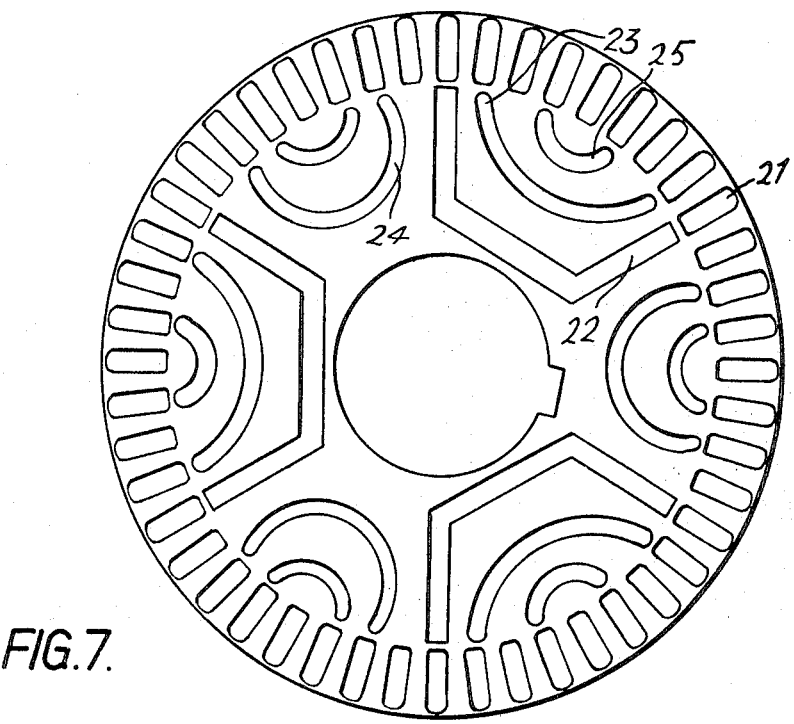
Figure 8:
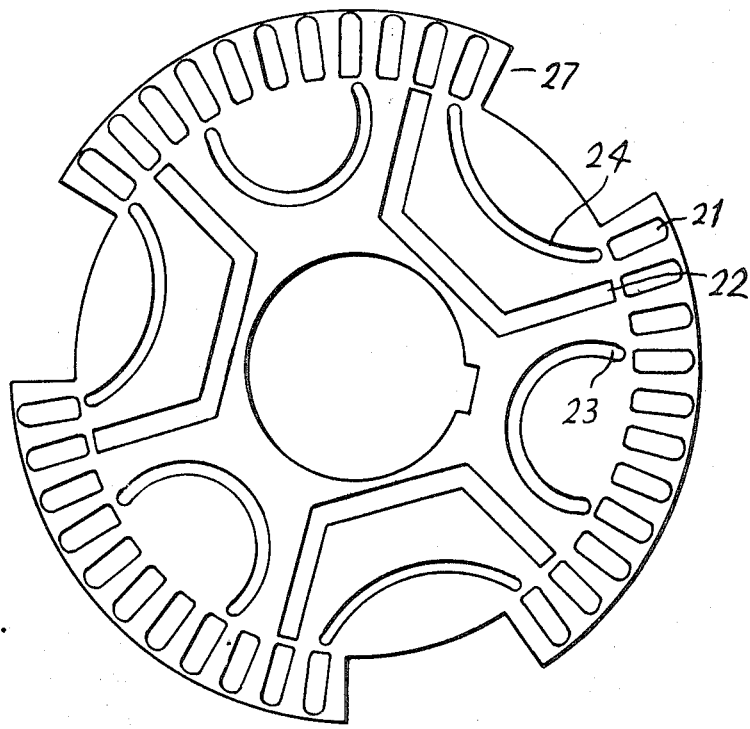
FIG. 8 illustrates another modification of the arrangement illustrated in FIG. 6 in which axially extending grooves 27 are provided in the periphery of the rotor within the sectors defined by the ends of the main flux barriers 22.
Figure 9:
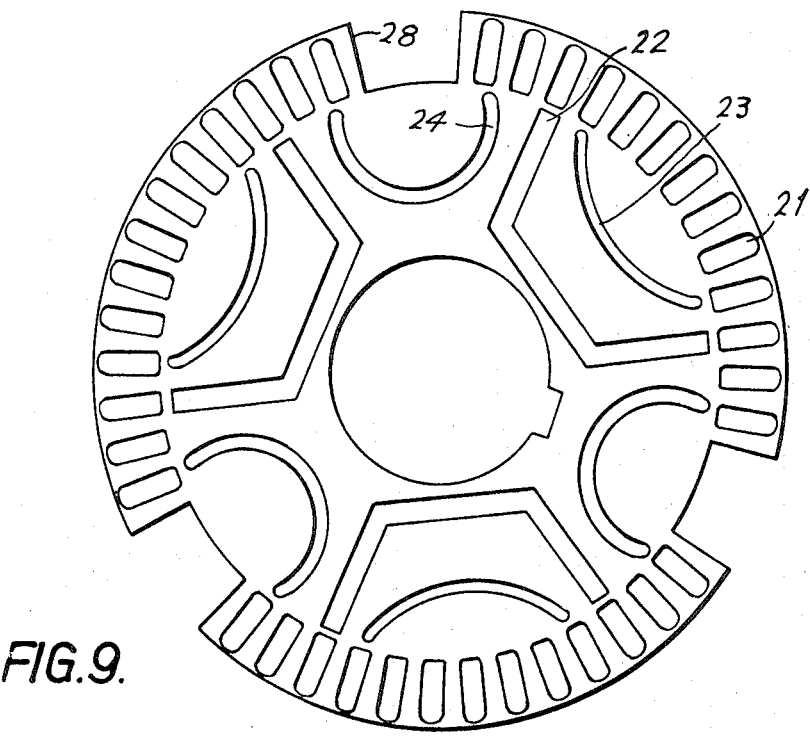
FIG. 9 illustrates another arrangement in which axially extending grooves 28 are provided in the sectors lying between the ends of adjacent main flux barriers.
Figure 10:
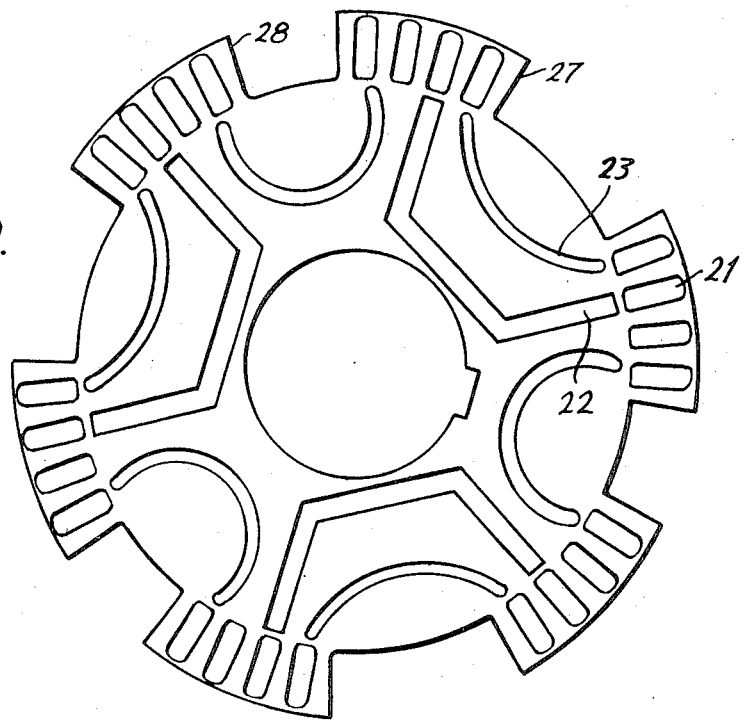
FIG. 10 illustrates yet another modification which incorporates both kinds of axial grooves 27 and 28 as illustrated in FIG. 8 and FIG. 9.

The various axial grooves illustrated above may be filled with conductive material connected to the endrings of the squirrel cage winding.

I claim:

1. A reluctance motor comprising a stator member wound to provide a magnetic field having $p$ pole-pairs and a rotor member of unitary stampings having a short-circuited electrical winding and magnetic material in which there are $p$ flux barriers following the paths of direct axis flux between alternate pairs of poles but lying athwart the paths of quadrature axis flux, where $p$ is a whole number of at least three, wherein circumferential grooves are provided in the periphery of the rotor in the sectors between adjacent main flux barriers and said flux barriers terminate at positions which are within the boundary of the stampings.

2. A reluctance motor comprising a stator member wound to provide a magnetic field having $p$ pole-pairs and a rotor member of unitary stampings having a short-circuited electrical winding and magnetic material in which there are $p$, and only $p$ main flux barriers following the paths of direct axis flux between alternate pairs of poles but lying athwart the paths of quadrature axis flux, where $p$ is a whole number of at least three, with circumferential grooves provided in the periphery of the rotor in the sectors between the ends of the main flux barriers, said main flux barriers being symmetrically distributed around the rotor such that the angles at the central axis of the rotor subtended between the ends of each flux barrier and between the ends of adjacent flux barriers is given by $\pi/p$ radians and terminating at positions which are within the boundary of said stamping.

3. The reluctance motor as claimed in claim 2 in which auxiliary flux barriers are provided which extend generally parallel to the main flux barriers and are embraced by them.

4. The reluctance motor as claimed in claim 3 in which each main flux barrier embraces a single auxiliary flux barrier.

5. The reluctance motor as claimed in claim 3 in which each main flux barrier embraced at least two auxiliary flux barriers.

6. A reluctance motor comprising a stator member wound to provide a magnetic field having $p$ pole-pairs and a rotor member having a short-circuited electrical winding and magnetic material in which there are $p$ flux barriers following the paths of direct axis flux between alternate pairs of poles but lying athwart the paths of quadrature axis flux, where $p$ is a whole number of at least three, and wherein circumferential grooves are provided in the periphery of the rotor in the sectors between adjacent main flux barriers.

7. A reluctance motor comprising a stator member wound to provide a magnetic field having $p$ pole-pairs and a rotor member having a short-circuited electrical winding and magnetic material in which there are $p$ flux barriers following the paths of direct axis flux between alternate pairs of poles but lying athwart the paths of quadrature axis flux, where $p$ is a whole number of at least three, and wherein auxiliary flux barriers are provided in the sectors between the ends of adjacent main flux barriers.

* * * * *